US008010996B2

(12) United States Patent
Cline et al.

(10) Patent No.: US 8,010,996 B2
(45) Date of Patent: *Aug. 30, 2011

(54) AUTHENTICATION SEAL FOR ONLINE APPLICATIONS

(75) Inventors: Lee Kimball Cline, San Francisco, CA (US); Aanchal Gupta, San Jose, CA (US); Christopher Michael Blessing, San Jose, CA (US); Lawrence Gordon Tesler, Portola Valley, CA (US); John Andrew Geishecker, III, San Francisco, CA (US); Naveen Agarwal, Fremont, CA (US); Arturo Bejar, Saratoga, CA (US); Daniel Alexander Hendricks, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1038 days.

This patent is subject to a terminal disclaimer.

(21) Appl. No.: 11/627,161

(22) Filed: Jan. 25, 2007

(65) Prior Publication Data

US 2008/0046968 A1 Feb. 21, 2008

Related U.S. Application Data

(63) Continuation-in-part of application No. 11/458,048, filed on Jul. 17, 2006.

(51) Int. Cl.
*G06F 7/04* (2006.01)
(52) U.S. Cl. .................... 726/2; 715/700; 726/26
(58) Field of Classification Search .............. 715/700; 726/2, 26
See application file for complete search history.

(56) References Cited

U.S. PATENT DOCUMENTS

| 5,842,221 | A | * | 11/1998 | Schmonsees | 707/104.1 |
|---|---|---|---|---|---|
| 6,018,801 | A | | 1/2000 | Palage et al. | |
| 6,950,949 | B1 | | 9/2005 | Gilchrist | |
| 7,346,775 | B2 | | 3/2008 | Gasparini et al. | |
| 7,562,222 | B2 | | 7/2009 | Gasparini et al. | |
| 2003/0158816 | A1 | | 8/2003 | Rouse | |
| 2005/0144451 | A1 | | 6/2005 | Voice et al. | |
| 2005/0172229 | A1 | * | 8/2005 | Reno et al. | 715/700 |
| 2006/0020812 | A1 | * | 1/2006 | Steinberg et al. | 713/181 |

(Continued)

OTHER PUBLICATIONS

2nd TIPPI Workshop, Trustworthy Interfaces for Passwords and Personal Information, Security Skins: The Design and Evaluation of Unspoofable, Embedded Security Indicators [slides], Jun. 19, 2006, *Rachna Damija, Harvard University.*

(Continued)

*Primary Examiner* — Thanhnga B Truong
*Assistant Examiner* — Angela Holmes
(74) *Attorney, Agent, or Firm* — Frommer Lawrence & Haug LLP; Jamie L. Wiegand

(57) ABSTRACT

A network device and method are directed towards providing a client side sign-in seal for use detecting phishing attempts. In one embodiment, a user of a client device may provide anti-phishing data through a sign-in setup user interface for a website, application, or the like. In one embodiment, the anti-phishing data is an image provided by the user. The user may also provide text, symbols, an audio clip, or the like. The user may also modify aspects of the image, text, symbols, or the like, such as a color. When the user accesses the website, application, or the like, the client device may provide client device data used to locate and display the sign-in seal. If the user is being phished, the anti-phishing data may not be displayed or otherwise played.

20 Claims, 9 Drawing Sheets

U.S. PATENT DOCUMENTS

2006/0259767 A1* 11/2006 Mansz et al. ............ 713/168
2007/0199054 A1* 8/2007 Florencio et al. ............ 726/5
2008/0034428 A1 2/2008 Bejar et al.

OTHER PUBLICATIONS

Rachna Dhamija et al., Why Phishing Works, Apr. 2006.
Rachna Dhamija et al., The Battle Against Phishing: Dynamic Security Skins, Jul. 2005.
Registration Demonstration; Sign-in From New Device; Sign-in Demonstration, Jun. 2006.
D. Kristol et al., Memo re: HTTP Statement Management Mechanism, Network Working Group Request for Comments: 2109, Standards Track, Feb. 1997.
Office Communication for U.S. Appl. No. 11/458,048 mailed Aug. 6, 2009.
Office Communication for U.S. Appl. No. 11/458,048 mailed Feb. 19, 2010.
Office Communication for U.S. Appl. No. 11/458,048 mailed May 3, 2010.
Office Communication for U.S. Appl. No. 11/458,048 mailed Oct. 15, 2010.

* cited by examiner

AUTHENTICATION SEAL FOR ONLINE APPLICATIONS

CROSS REFERENCE TO RELATED APPLICATIONS

This application is a Continuation-In-Part patent application of U.S. patent application Ser. No. 11/458,048, filed Jul. 17, 2006, entitled "Anti-Phishing For Client Devices," and claims the benefit under 35 U.S.C. §120, which is further incorporated herein by reference.

BACKGROUND

The present invention relates generally to computing security, and more particularly but not exclusively to providing a user interface for enabling a user of a client device to setup and employ an anti-phishing authentication seal detection mechanism, useable in one embodiment, for sign-in authentication.

A major type of internet fraud, today, is known as phishing. Phishing typically involves the practice of obtaining confidential information through the manipulation of legitimate users. Typically, the confidential information is a user's password, credit card details, social security number, or other sensitive user information. Phishing may be carried out by masquerading as a trustworthy person, website, or business. In one approach, a message may be sent to an unsuspecting user. The message may include a link or other mechanism that links to an illegitimate source. In another approach, a webpage that may appear to be legitimate is provided to the user. However, the webpage (or message) is designed to trick the user into providing their confidential information. Such webpages (or messages) may relate to account log-in sites, credit card entry sites, or the like. Once the unsuspecting user enters their information, the phisher may be able to obtain the sensitive information and use it to create fake accounts in a victim's name, ruin the victim's credit, make purchases under the victim's name, sell the information to others, perform acts under the victim's identity, or even prevent the victim from accessing their own money and/or accounts.

Unfortunately, this type of fraudulent activity is becoming more popular, primarily because of how easy it is to convince people to divulge their sensitive information over the internet. It has been estimated that between May 2004 and May 2005, for example, over one million computer users in the United States suffered over $900 million in losses due to such fraudulent phishing schemes. Because victims to these attacks may reduce their activities over the internet with websites that have been phished, many legitimate busineses may also suffer both financially, and in their reputation.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

Figure 1:
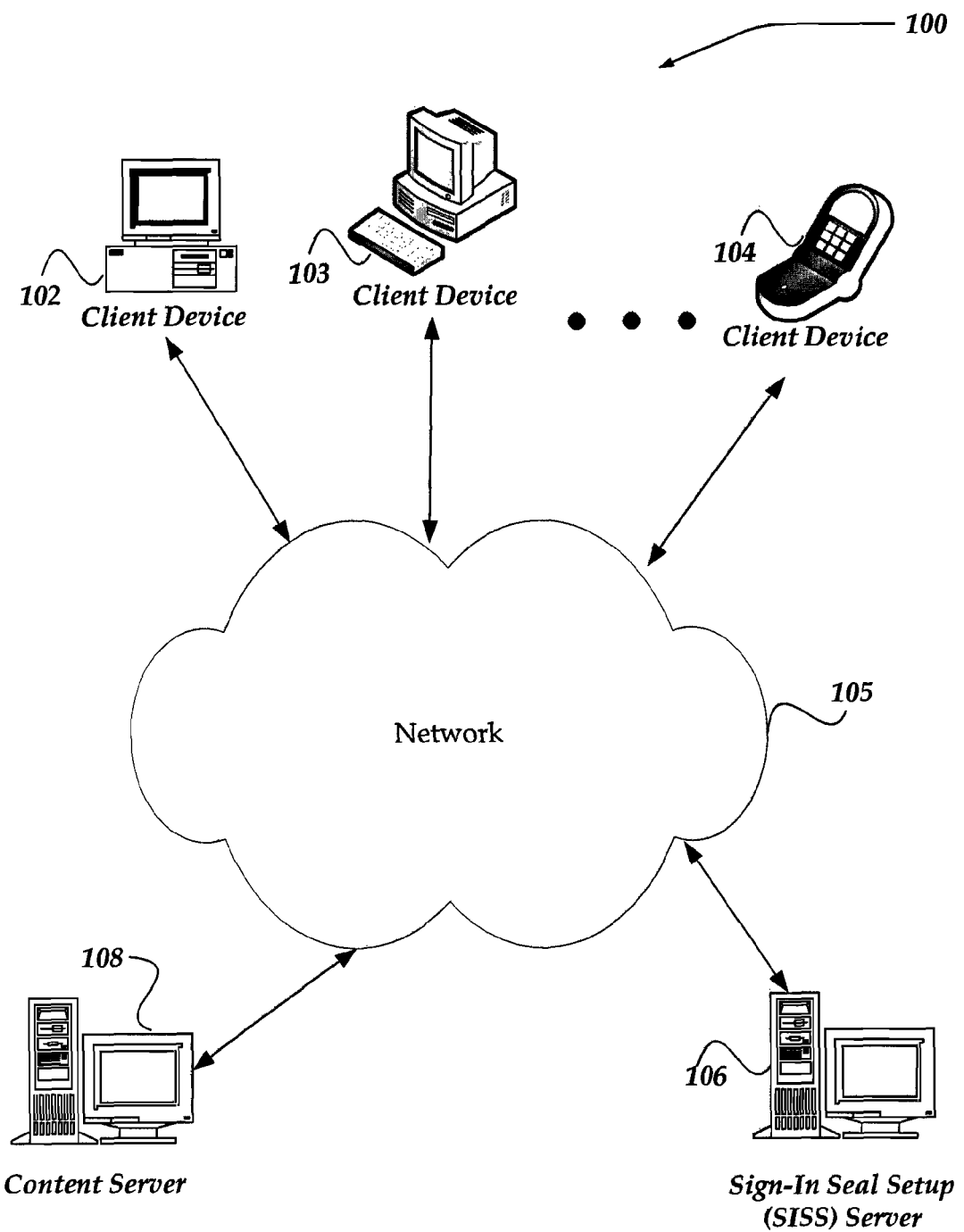
FIG. 1 shows a functional block diagram illustrating an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The terms "sensitive," and "confidential" information refer to any information that a user would prefer not to be widely distributed. Such information may be something that the user knows, such as their social security number, a password, encryption key number, credit card number, financial information, driver's license number, insurance number, mother's maiden name, or the like. The information may also represent data about the user, including, for example, their age, birth date, medical information, or the like.

HTTP cookies are described in a Request For Comments (RFC) 2109, available through the Internet Engineering Task Force (IETF), and which is incorporated herein by reference. A slightly different description is provided through Netscape's Support Documentation, entitled "Persistent Client State HTTP Cookies." As used herein, the term "cookie" refers to information that gets passed from a server to a client, and passed back by the client and substantially conforms to the descriptions of cookies in the above documents. Such information may be passed in both directions in an HTTP header. A cookie generally includes a name-value pair, and the term cookie may refer to the value, the name, or the combination of both, or a part of the combination. As used herein, a server may send the client a cookie, and the client may return the cookie it received, and both the sent and returned information is considered to be the same cookie.

Briefly, the present invention is directed towards enabling a user to generate and manage a sign-in seal useable in detecting phishing attempts. In one embodiment, the user of a client device may select a website, application, or the like, for which to associate the sign-in seal. The user may provide anti-phishing data through a sign-in setup interface. In one embodiment, the user provides the anti-phishing data absent being requested to or otherwise providing user authentication information. Thus, in one embodiment, the anti-phishing data may be user independent. In another embodiment, the anti-phishing data is based, at least in part, on a user authentication for the client device (such as, for example, a user log-in to a client device's operating system's managed account, or the like). However, generation of the sign-in seal may remain, in one embodiment, independent of user authentication information.

While the parent U.S. patent application entitled "Anti-Phishing For Client Devices," (which is incorporated by reference herein) is directed (although not exclusively) towards an overall infrastructure for detecting a phishing attack over a network, the present invention is directed towards, although not exclusively, a user interface for enabling a user to create and manage a client side sign-in seal that may be independent of user authentication inputs, such as a user name/password, digital certificate or the like, as part of the generation of the sign-in seal.

In any event, the anti-phishing data provided may include an image, text data, audio data, characteristics about how to display the anti-phishing data in a sign-in seal, or the like. In one embodiment, the anti-phishing data may be converted to an image file for use in the sign-in seal. The client device may then receive encrypted client device data indicating the website, application, or the like, for which the anti-phishing data is associated. The client device data may also include information on where the anti-phishing data is located. In one embodiment, the client device data is structured to be specific to the website, application, or the like. In one embodiment, the client device data is received in the form of a cookie. When the user of the client device accesses the website, application, or the like, the client device may provide the client device data. In one embodiment, the client device data may only be decrypted by an authentic website. The client device data may then be used to locate and display and/or play the anti-phishing data in the sign-in seal. In one embodiment, the anti-phishing data is provided in a transient form, such as a URL, or the like, that may change or otherwise be non-permanent. If the user is being phished, the sign-in seal may not be displayed (or played). When the sign-in seal is not displayed (or played), the user may conclude that the website, application, or the like, is not authentic, or that the user is being phished, or the like, and may then take an appropriate response. That is, the sign-in seal's presence or absence may be used to enable the website, application, or the like, to authenticate itself to the user.

Although the above embodiments are described in terms of a client-server architecture, the invention is not so limited. For example, various embodiments may also employ a server to server, or even a peer to peer architecture, without departing from the scope of the invention.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, content server 108, and Sign-In Seat Setup (SISS) server 106. Client devices 102-104 are in communication with each other, content server 108, and SISS server 106 through network 105. Content server 108 and SISS server 106 may also be in communication with each other through network 105.

One embodiment of a client device is described in more detail below in conjunction with FIG. 2. Briefly, however, client devices 102-104 may include virtually any computing device capable of receiving and sending a message over a network, such as network 105, to and from another computing device. The set of such devices described in an exemplary embodiment below generally includes mobile devices that are usually considered more specialized devices with limited capabilities and typically connect using a wireless communications medium such as cell phones, smart phones, pagers, radio frequency (RF) devices, infrared (IR) devices, Citizen's-Band Radios (CBs), integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like. In one embodiment, one or more messenger applications may be configured to setup anti-phishing.

Client devices 102-104 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 105 is configured to couple client devices 102-104, with other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102-104, SISS server 106, and/or content server 108.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Content server 108 includes virtually any network computing device that is configured to provide various resources, including content and/or services over network 105. Content server 108 may provide content and/or services for any of a variety of activities, including, but not limited to merchant businesses, financial businesses, insurance businesses, educational, governmental, medical, communication products, and/or services, or virtually any other site of interest. Many of such activities may communicate over the internet using a variety of mechanisms, including, but not limited to email, webpages, IM, SMS, or the like.

Typically, content server 108 may include an interface that may request sensitive information from a user of client device 102-104. For example, content server 108 may provide access to an account, which may request user log-in information. Such log-in information may include a user name, password, an entry of a key number, or the like. In another example, content server 108 may request other sensitive information, such as a credit card number, medical information, or the like. For example, content server 108 may operate as a merchant site that on at least one webpage of its website, there is a request for entry of sensitive information, including financial information, or the like. In one embodiment, a webpage may include a form, or virtually any other data entry mechanism.

Content server 108 may, in one embodiment, provide a link, or other mechanism to direct a user to SISS server 106 to enable initial configuration of a client side sign-in seal. In one embodiment, content server 108 may receive client device data from a client device for use in displaying (or otherwise playing) anti-phishing data in the sign-in seal, where the sign-in seal may be used by the user to determine if the user is being phished.

Devices that may operate as content server 108 include, but are not limited to personal computers, desktop computers, multiprocessor systems, microprocessor-based or programmable consumer electronics, network PCs, servers, network appliances, and the like.

One embodiment of SISS server 106 is described in more detail below in conjunction with FIG. 3. Briefly, however, SISS server 106 includes virtually any network device that is configured to enable a user to provide and/or configure anti-phishing data into a sign-in seal for use in authenticating a communication over a network. SISS server 106 may be configured to provide a user interface that enables the user to provide anti-phishing data for use in a sign-in seal, and to further modify, manage, and even preview the sign-in seal. Embodiments of a user interface useable to generate and manage the client side sign-in seal are described in more detail below in conjunction with FIGS. 6-9.

SISS server 106 may be further configured to provide client device data to the client device that indicates where the anti-phishing data is to be employed. The client device data may also include information about where the anti-phishing data may be located. In one embodiment, the client device data is structured to be specific to the website, application, or the like. For example, in one embodiment, the client device data is received in the form of a cookie.

SISS server 106 may also be configured to interact with content server 108, an application residing on client devices 102-104, or the like, to enable the application and/or content server 108 to employ the client device data to display the sign-in seal.

Although SISS server 106 and content server 108 are illustrated as distinct network devices, the invention is not so limited. For example, a single network device may be configured to perform the operational aspects of SISS server 106 and content server 108, or even a plurality of network devices may be configured such that the operational aspects of SISS server 106 and/or content server 108 are distributed over the plurality of network devices. For example, in one embodiment, the anti-phishing data or the like for a user may reside on one network device, while the user interface useable to create and manage the sign-in seal may reside on another network device.

Illustrative Client Device

Figure 2:
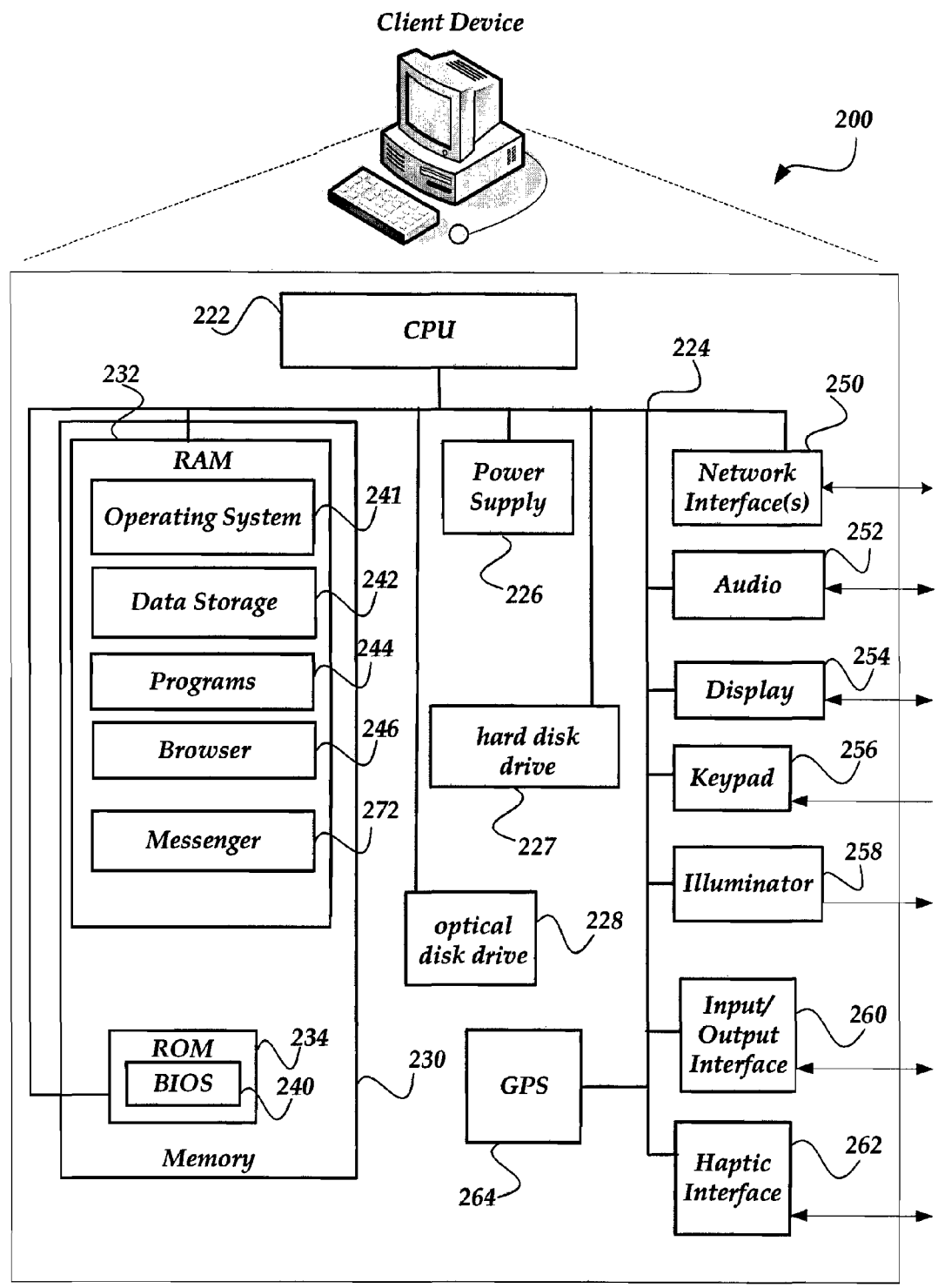
FIG. 2 shows one embodiment of a client device that may be employed.

FIG. 2 shows one embodiment of client device 200 that may be included in a system implementing the invention. Client device 200 may represent one embodiment of client devices 102-104 of FIG. 1.

Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an optional audio interface 252, a display 254, a keypad 256, an illuminator 258, an input/ output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Client device 200 may further include additional mass storage facilities such as optical disk drive 228 and hard disk drive 227. Hard disk drive 227 is utilized by client device 200 to store, among other things, application programs, databases, and the like. Additionally, optical disk drive 228 and hard disk drive 227, a flash memory, or the like may store cookies, data, images, or the like.

Keypad 256 may comprise any input device arranged to receive input from a user (e.g. a sender). For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, mouse, stylus, or other input or output devices. Input/output interface 260 can utilize one or more communication technologies, such as USB, infrared, Bluetooth™, and the like. Optional haptic interface 262 is arranged to provide tactile feedback to a user (e.g. a sender) of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Client device 200 may also be configured to manage activities and data for one user distinct from activities and data for another user of client device 200. For example, in one embodiment, operating system 241 may be configured to manage multiple user accounts. For example, client device 200 may employ an operating system that is configured to request a user to provide account information, such as a user name/password, smart card, s/key, or the like. When the user logs into the associated account, operating system 241 may then manage data, activities, and the like, for the user separate from at least some of the data, activities, and the like, for another user. Thus, in one embodiment, operating system 241 may be configured to store client device data, cookies, anti-phishing data, or the like, based on a client device account. Moreover, settings, configurations, or the like, of browser 246, messenger 272, or the like, may be based on the user account. Thus, when user A is logged into their client user account, browser 246 may receive, store, and/or retrieve cookies for user A, distinct from cookies associated with another user account on client device 200. Moreover, the cookie(s) may be stored to be persistent cookies. That is, in one embodiment, the cookie(s) may be stored within XML cache, flash or some other location, where it may remain, even when a user employs a browser's delete cookie command, or the like.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like. Moreover data storage 242 may be used to store information such as data received over a network from another computing device, data output by a client application on client device 200, data input by a user of client device 200, or the like. For example, data storage 242 may include data, including cookies, and/or other client device data sent by a network device. Data storage 242 may also include image files, anti-phishing data, or the like, for display and/or use through various applications. Moreover, although data storage 242 is illustrated within memory 230, data storage 242 may also reside within other storage mediums, including, but not limited to optical disk drive 228, hard disk drive 227, or the like.

Programs 244 may also include computer executable instructions which, when executed by client device 200, transmit, receive, and/or otherwise process messages and enable telecommunication with another user of another client device. Other examples of application programs include calendars, contact managers, task managers, transcoders, database programs, word processing programs, security programs, spreadsheet programs, games, CODEC programs, and so forth. In addition, mass memory 230 stores browser 246, and messenger 272.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Similarly, browser 246 may be configured to receive, store, and/or provide data. For example, in one embodiment, browser 246 may receive and store client device data in the form of a cookie, or the like. In one embodiment, browser 246 may also provide the client device data, cookie, or the like over a network when visiting a webpage that matches the cookie rules. In one embodiment, browser 246 is configured to manage data in a persistent manner. For example, when cookies or other data are deleted, using for example, a delete cookie option within browser 246, or the like, a persistent cookies remains, and are not deleted, as discussed above.

Browser 246 may also be configured to communicate with a network device, or the like, for use in generating and managing a sign-in seal. For example, browser 246 may be configured to receive and to display a user interface from the network device. The user of client device 200 may then employ the displayed user interface, keypad, and/or other interface devices, to provide anti-phishing data, preview the sign-in seal that includes the anti-phishing data, and/or modify, save, or the like, the sign-in seal for use in authenticating a website, application, or the like. In one embodiment, the user interface may be configured substantially similar to those described below in conjunction with FIGS. 6-9.

Messenger 272 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 272 may be configured as an IM application, such as AOL Instant Messenger, Yahoo! Messenger, NET Messenger Server, ICQ, or the like. In another embodiment, messenger 272 may be a client application that is configured to integrate and employ a variety of messaging protocols.

Moreover, messenger 272 may be configured to include an interface that may request sensitive user information, such as username/password, credit card information, medical information, or the like. As such, messenger 272 may also enable the user of client device 200 to provide anti-phishing data for use in displaying a sign-in seal useable in determining whether messenger 272 is authentic, or whether the user is being phished. In one embodiment, messenger 272 may operate "stand alone," to configure itself and employ a sign-in seal for detecting phishing. In another embodiment, messenger 272 may interact with another computing device, such as SISS server 106 of FIG. 1, or the like, to identify and employ client side anti-phishing data in a sign-in seal for use in detecting phishing, or other fraudulent activities.

Moreover, client device may employ a process such as described below in conjunction with FIG. 4 to perform at least some of its phishing detection operations.

Illustrative Server Environment

Figure 3:
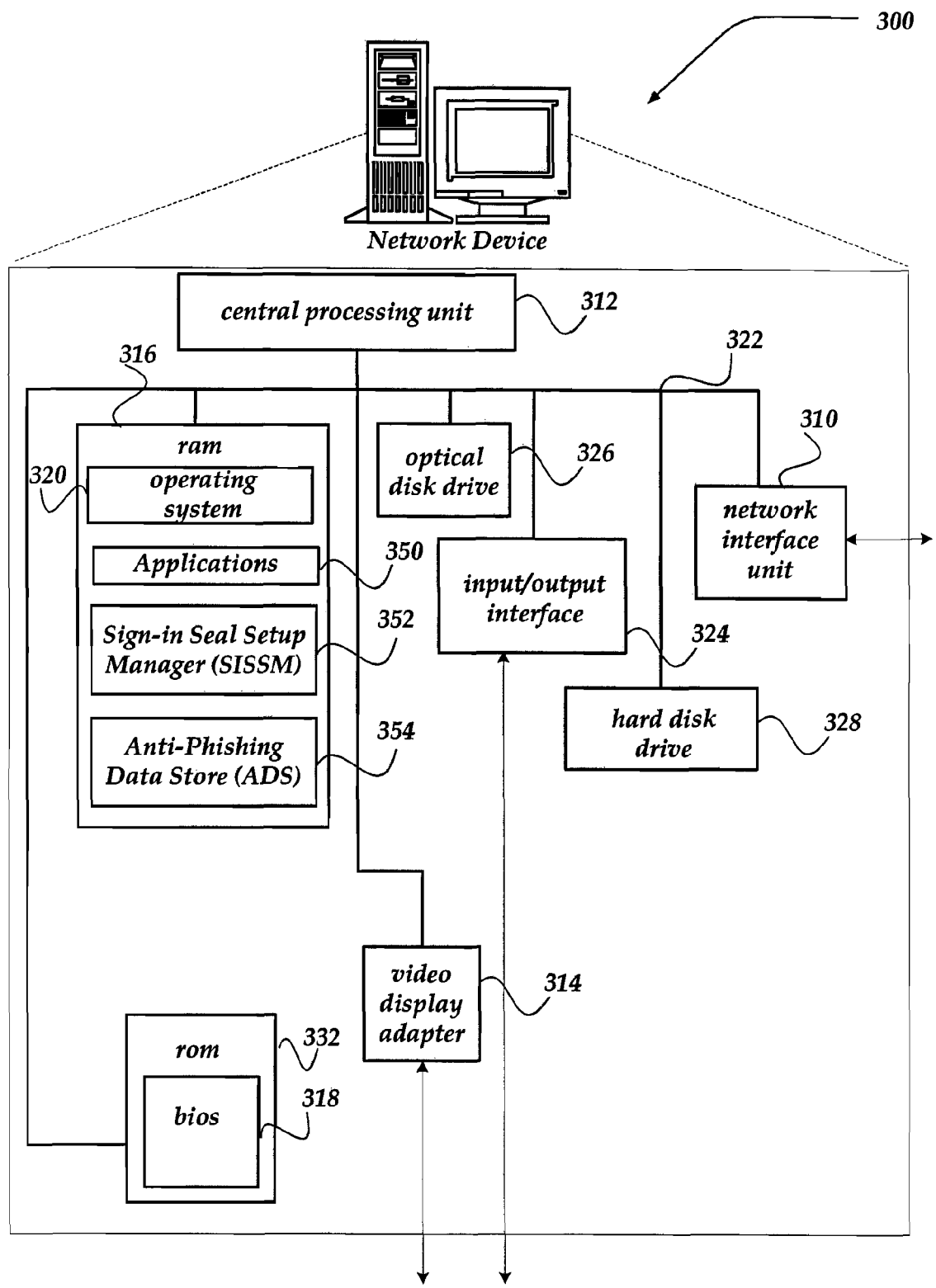
FIG. 3 shows one embodiment of a network device that may be employed to provide an anti-phishing service.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may, for example, represent SISS server 106 of FIG. 1.

Network device 300 includes processing unit 312, video display adapter 314, and a mass memory, all in communication with each other via bus 322. The memory generally includes RAM 316, and ROM 332. Network device 300 also includes one or more mass storage devices, such as hard disk drive 328, tape drive, optical disk drive, and/or floppy disk drive. The memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, network interface card (NIC), or the like.

Network device 300 may also include an SMTP handler application for transmitting and receiving email. Network device 300 may also include an HTTP handler application for receiving and handing HTTP requests, and an HTTPS handler application for handling secure connections. The HTTPS handler application may initiate communication with an external application in a secure fashion.

Network device 300 also may include input/output interface 324 for communicating with external devices, such as a mouse, keyboard, scanner, or other input devices not shown in FIG. 3. Likewise, network device 300 may further include additional mass storage facilities such as optical disk drive 326 and hard disk drive 328. Hard disk drive 328 is utilized by network device 300 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 350 are loaded into memory and run on operating system 320. Examples of application programs include email programs, schedulers, calendars, transcoders, database programs, word processing programs, spreadsheet programs, security programs, web servers, and so forth. Mass storage may further include applications such Sign-in Seal Setup Manager (SISSM) 352, and Anti-Phishing Data Store (ADS) 354.

ADS 354 is configured to store and manage information about associated with anti-phishing data, including, but not limited to cookies, client device data, images, text data, graphical data, audio files, links, and the like. For example ADS 354 may include information that maps a website, application, or the like, to a client device, anti-phishing data, or the like. Thus, ADS 354 may be implemented as a file, a folder, script, a program such as a database, or the like. In one embodiment, ADS 354 may reside on another network device, other than network device 300, without departing from the scope of the invention.

SISSM 352 is configured to provide a user interface to manage setup of a phishing detection mechanism using a client side sign-in seal. SISSM 352 may enable a user to identify anti-phishing data for use with a website, application, or the like, based on the client device, rather than based on a user's server log-in, remote user account information, user digital certificate, or other non-client device based user authentication mechanisms.

In one embodiment, the user interface is configured as web pages that may be displayed within a browser application. In one embodiment, the browser may be virtually any browser, including, but not limited to browsers without Java or special purpose plug-ins enabled.

However, the user interface is not constrained to a browser interface. For example, the user interface may be an application, script, applet, or the like, that may, in part, be downloaded to the user's client device, for generation and/or management of the user's client side sign-in seal.

In one embodiment, the user is provided with a user interface that is configured to progressively enable the user to 'walk' through generation and/or modification of their client side sign-in seal. As the user makes a selection additional fields within the user interface may be activated, and/or made visible, for additional input from the user.

In one embodiment, help, frequently asked questions, or the like, may be selected by the user to obtain additional guidance in generation and use of the client side sign-in seal.

In one embodiment, the user may provide anti-phishing data in the form of an image, text data, audio data, multimedia data, or the like, that may be used to generate the sign-in seal for use in detecting phishing. In one embodiment, the user may select virtually any image from their collection of images, or the like. In this manner, the user may select an image that might be more personalized to the user, rather than selecting from a pre-defined set of images. By further enabling the user to select from their own collection of images, there is a lesser likelihood that a phisher, hacker, or the like, could guess the image used for that user. Selection from a pre-defined set of images, however, may increase the likelihood that the phisher, hacker, or the like, may guess the image the user is using in their sign-in seal. However, the invention is not constrained to merely using images from the user's own collection of images. For example, in another embodiment, SISSM 352 may enable the user to select pre-defined images, text, audio data, multimedia data, or other anti-phishing data rather than providing their 'own' anti-phishing data.

In one embodiment, the user may provide text data instead of or in addition to the image. Moreover, the user may further provide information about how to display the text data, including a text color, text size, text font type, background color or colors, and the like. In one embodiment, the user may also be enabled to provide various symbols, icons, emoticons, or the like, as anti-phishing data for use in the sign-in seal.

In one embodiment, the anti-phishing data may be provided over a secure communications channel, using any of a variety of mechanisms, including, for example, HTTPS, SSL/TLS, or the like.

In one embodiment, SISSM 352 may convert the provided text data to an image. In one embodiment, where an image is provided, SISSM 352 may modify the image to accommodate a display constraint, such as resolution, size, or the like. SISSM 352 may also store the anti-phishing data in ADS 354.

In one embodiment, the anti-phishing data may reside on the client device. As such, in one embodiment, SISSM 352 may receive a location identifier that indicates where on the client device the anti-phishing data may be located. In one embodiment, SISSM 352 may also receive the anti-phishing data, modify it, and provide it back to the client device.

SISSM 352 may employ various mechanisms to associate the anti-phishing data to a client device, and to an application, website, or the like. For example, in one embodiment, SISSM 352 may employ a cookie to manage client device data that links the anti-phishing data with the client device, application, and/or website. The client device data may, in one embodiment, be encrypted using any of a variety of encryption mechanisms. In one embodiment, the client device data may also be digitally signed to identify the website, application, or the like, for which the client device data is associated. SISSM 352 may then provide the client device data in the form of a cookie to the client device, in one embodiment. In one embodiment, SISSM 352 may further interact with the website, application, or the like, to enable it to request and display the anti-phishing data in a sign-in seal at an appropriate operation, including, for example, before or when sensitive information may be requested. SISSM 352 may also be configured to modify an application, such as a messenger client application, or the like, based on the anti-phishing data, and to provide the modified application to the client device. In one embodiment, SISSM 352 may employ at least a portion of process 500 to perform some of its actions.

Generalized Operation

Figure 4:
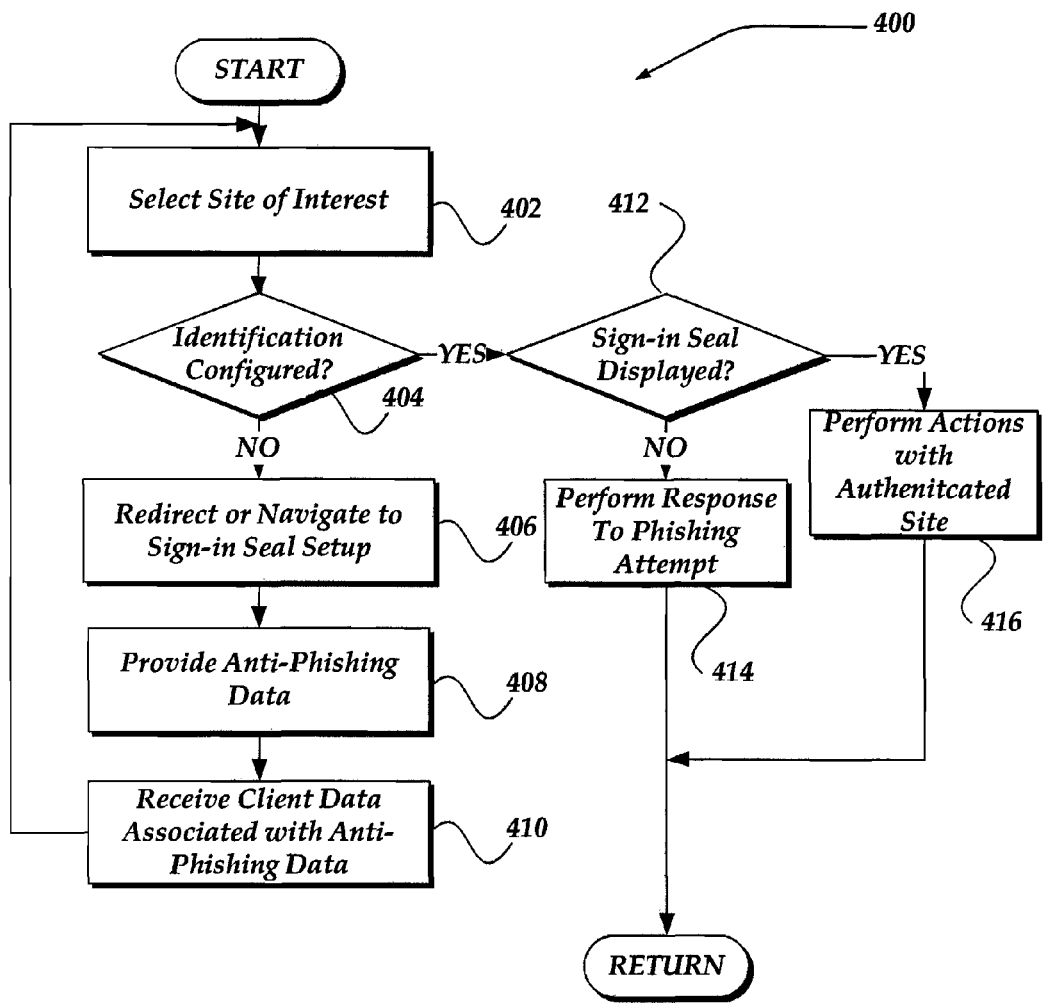
FIG. 4 illustrates a flow diagram generally showing one embodiment for a client process of managing a client side authenticating a communication over a network.

FIG. 4 illustrates a flow diagram generally showing one embodiment for a client process of managing a client side sign-in seal for detecting phishing. Process 400 of FIG. 1 may, for example, be implemented within at least one of client devices 102-104 of FIG. 1.

Process 400 begins, after a start block, at block 402 where a user of a client device selects a site of interest. The site of interest may include a log-in webpage at a website, a webpage that for entry of financial information or a webpage at a network site that may request virtually any sensitive information from a user. Moreover, although the process describes a networked website as the site of interest, the invention also encompasses applications, such as messenger applications, financial applications, or the like, that may also request sensitive information. In one embodiment, as the user selects the site of interest, if the client device is already so configured, the client device may provide client device data to the server device hosting the site of interest. In one embodiment, the client device data may be provided through an HTTP request within an encrypted cookie. In one embodiment, the cookie is configured to be persistent, such that a typical browser command to delete cookies does not affect the persistent cookie.

Process 400 then flows to decision block 404 where a determination is made whether the site of interest is configured with client side sign-in seal, for phishing detection. In one embodiment, if the client device has not provided anti-phishing data for this site, then an icon, link, or other indicator may be displayed to the user, such as described below in conjunction with FIG. 6. The user of the client device may then select the indicator to identify that the anti-phishing data is not provided, but intends to provide it. Processing flows to block 406. If however, the user does not see the indicator and the user has already provided anti-phishing data for the client device, the indicator appears to be suspect or the like, processing flows to decision block 412.

At block 406, selection of the indicator redirects or otherwise navigates the user to a setup interface that is configured to enable the user to provide and/or configure anti-phishing data for the present client device for use in a client side sign-in seal. In one embodiment, the redirection may include establishing a secure communications channel with the client device. In one embodiment, a SSL/TLS communications session may be established, in part, using a server-side digital certificate for authentication.

Processing continues to block 408, where the user may provide and/or configure anti-phishing data for the client device independent of being user authenticated through the setup interface or server device, or otherwise providing user authentication data. Thus, in one embodiment, the anti-phishing data and the associated sign-in seal may be user independent. In another embodiment, the anti-phishing data is based merely on any user authentication that may be performed for the client device.

The user interface may be configured to walk the user through a sequence of actions that enable the user to generate and/or otherwise manage a client side sign-in seal. One embodiment of the user interface is described in more detail below in conjunction with FIGS. 6-9.

Briefly, in one embodiment, the user may view a set of selections, including an ability to provide an image file. In another embodiment, the user may provide text and/or characteristics for the display of the text. In another embodiment, the user may provide a combination of text, graphical data, audio data, or the like. In one embodiment, the user may also record voice data, and/or other audio data as the anti-phishing data. Thus, the invention is not constrained in the type or combination of anti-phishing data that may be provided. In one embodiment, the anti-phishing data may be provided to the setup interface. In another embodiment, the user may provide to the setup interface information indicating a location of the anti-phishing data. For example, in one embodiment, the user may elect to retain the anti-phishing data on the client device. Therefore, the user may elect to provide a file name or names, and location(s) for the anti-phishing data. In one embodiment, the anti-phishing data may be modified to accommodate display constraints. For example, in one embodiment, the graphical data might be modified based on its size, resolution, or the like. In one embodiment, the text data may be converted to an image.

Processing may then flow to block 410, where client device data associated with the client device and anti-phishing data is provided. In one embodiment, the client device data is specific to the client device. For example, the client device data may include information that is intended to uniquely identify the client device, including a network address, a MAC address, an operating system characteristic of the client device, a hardware characteristic of the client device, and/or any combination of hardware, network, and/or software characteristics. In one embodiment, the client device data includes an identifier associated with the site of interest. In another embodiment, the client device data includes an identifier that enables locating the anti-phishing data. In one embodiment, the client device data is encrypted. In another embodiment, the client device data is provided to the client device in a cookie.

The user of the client device may also modify the anti-phishing data used in the sign-in seal. In addition, during block 408 (or even at block 410), the user may request a preview of how the client side sign-in seal based on the anti-phishing might appear at the site of interest (see, for example, FIG. 8 or 9). In any event, the user may, at some point in the process, select to return to the site of interest, in which case, processing loops back to block 402. Moreover, at any time, the user may cancel out from the process, delete the sign-in seal, anti-phishing data, or the like, without departing from the scope of the invention.

Continuing from decision block 412, a determination is made whether the sign-in seal is displayed at the site of interest. In one embodiment, it is expected that a communication between the site of interest and the client device includes sending of the client device data. The client device data is sent to the servers based on a rule that may be defined with the client data. For example, one rule might be implemented that states that a browser may send the cookie only to a server that matches the criterion defined when the cookie was issued. This criterion may include, but are not limited to using existing technologies, such as DNS, SSL/TLS, or the like. In one embodiment, the anti-phishing data, if provided, might be provided using a transient form, such as through a temporary URL, or the like. Thus, at decision block 412, if the sign-in seal is not displayed processing flows to block 414; otherwise, processing flows to block 416.

At block 414, the user may then perform actions' in response to the detected phishing attempt indicated by an absence of the user's client side sign-in seal, or the like. For example, the user may elect to terminate a communication with the site, provide a communication message to a known authority, or the like. In any event, process 400 may then return to a calling process to perform other actions.

At block 416, the sign-in seal is displayed/played to the user of the client device. In one embodiment, the sign-in seal is displayed/played within a webpage through a link to the anti-phishing data. In this manner, the anti-phishing data is not provided directly to the site of interest for use in the sign-in seal. In one embodiment, the link may be implemented to be valid for a pre-defined period of time. Thus, in one embodiment, the link may expire after the pre-defined period of time, thereby restricting access to the anti-phishing data. At block 416, the user may then perform actions based on a determination that the site is authentic because, at least in part, it displays the client side sign-in seal. Process 400 may then return to the calling process to perform other actions.

Figure 5:
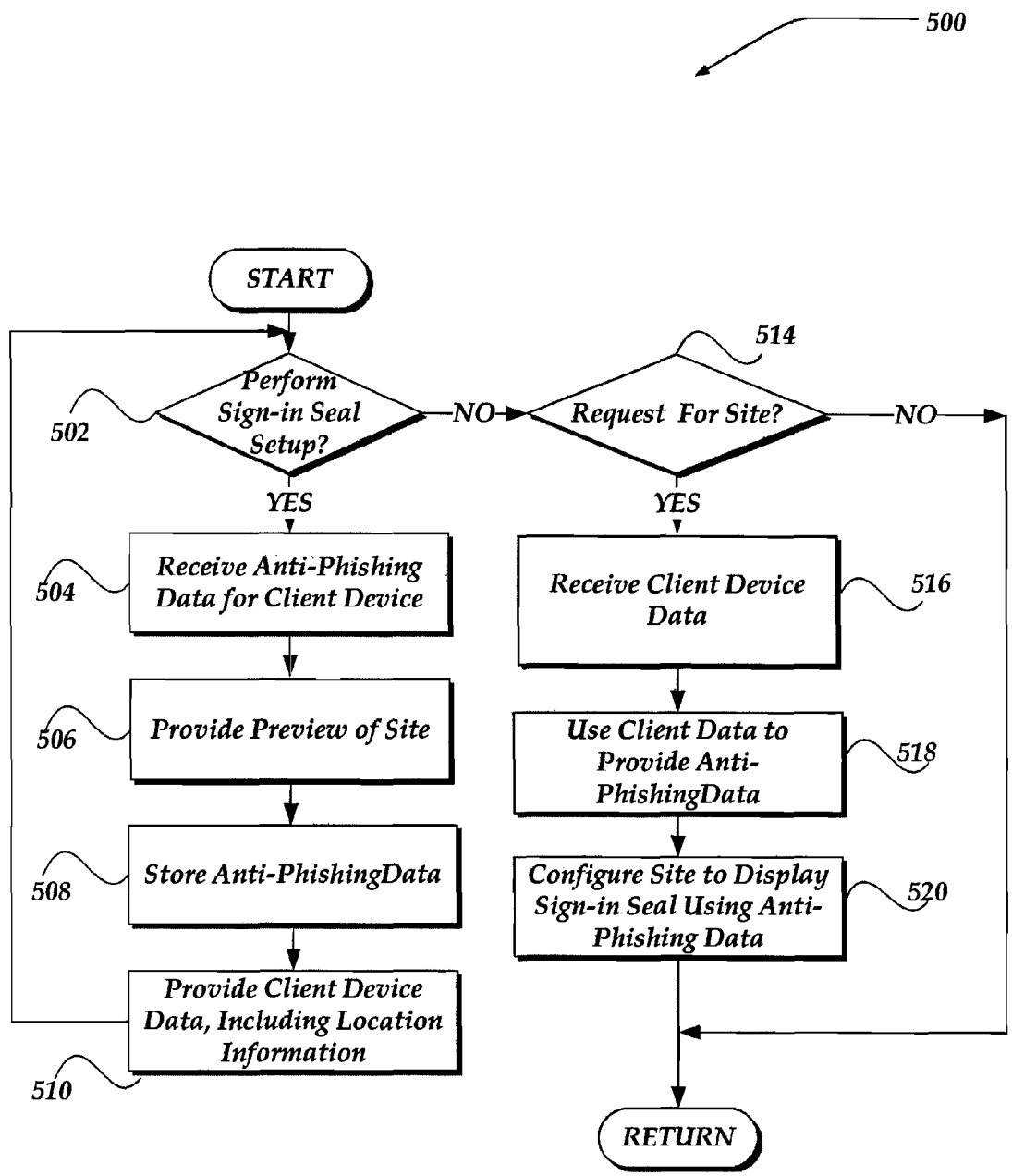
FIG. 5 illustrates a flow diagram generally showing one embodiment for a server or service oriented process of managing a client side authenticating a communication over a network.

FIG. 5 illustrates a flow diagram generally showing one embodiment for a server or service oriented process of managing a client side sign-in seal for use in authenticating such as a website over a network. Process 500 of FIG. 5 may be implemented, in part, in SISS server 106 and/or content server 108 of FIG. 1. In addition, at least some of process 500 may be performed, in part, by a client device, such as client devices 102-104 of FIG. 1. Moreover, it should be recognized that process 500 may also be implemented with an application, such as a messenger application, or the like.

Process 500 begins, after a start block, at decision block 502. At decision block 502, a determination is made whether a request to perform setup for phishing detection using a sign-in seal is received. For example, in one embodiment, a client device may provide an indication, such as selection of a link, icon, or the like, that directs the client device to a sign-in seal setup interface. If such indication is received, processing proceeds to block 504; otherwise, processing flows to decision block 514.

At block 504, anti-phishing data is received from the client device. As described above, the anti-phishing data may be received over a secure communications channel. Moreover, in one embodiment, the anti-phishing data may include an image, text, characteristics associated with the text, image, or the like, an audio file, or the like. In one embodiment, a location identifier may be provided that indicates where the anti-phishing data may be located on the client device. Moreover, in one embodiment, the location identifier may indicate that at least one portion of the anti-phishing data is located on the client device, while another portion may be located remotely. In still another embodiment, the location identifier may be to a default location, including a default folder, file, cookie, or the like. Processing then continues to block 506, where the anti-phishing data may be modified. For example, the user may select and/or change colors, the image, text, or the like. Then a preview of the proposed sign-in seal using the anti-phishing data is provided to the client device for review. If the user of the client device decides, the user may return to block 504 to provide different anti-phishing data, modified anti-phishing data, or the like. Processing then flows to block 508, where the user may indicate that the provided anti-phishing data is to be employed for use in the sign-in seal. In one embodiment, at block 508, the anti-phishing data may be stored. In one embodiment, the anti-phishing data is stored on a remote network device. In another embodiment, the anti-phishing data may be stored on the client device. In any event, client device data is then prepared that includes information indicating where the anti-phishing data is located.

In addition, the client device data is further prepared to indicate with which site the client device data may be associated. In one embodiment, the association may be implicit. In another embodiment, the client device data may be associated with multiple sites, or the like. In one embodiment, the client device data may include a numeric value, a network address, or the like, indicating the site domain (or application). The client device data may also include information that is intended to uniquely identifier the client device, as described above. In one embodiment, the client device data is encrypted. In another embodiment, the client device data is included within a cookie. In one embodiment, the cookie may include a link, URI, URL, or the like, to the client device data. In one embodiment, the cookie may include pointers that may be employed to reconstruct information indicating where the anti-phishing data, or the like, may be accessed. Processing then flows to block 510, where the client device data is provided to the client device. Process 500 then loops back to decision block 502.

Continuing from decision block 514, a determination is made whether a request for a site of interest is received. In one embodiment, blocks 514, 516, 518, and 520 are performed by a different network device, such as content server 108 of FIG. 1. If, at decision block 514, a request for a site of interest is received, processing flows to block 516, where the network device (or application) may request the client device to provide the client device data; otherwise, process 500 returns to a calling process. In one embodiment, the client device data is received within a cookie. Processing then flows to block 518, where the client device data is employed to locate the anti-phishing data.

Processing continues next to block 510, where the client device data is used to configure the site with the anti-phishing data. In one embodiment, the anti-phishing data is inserted into a webpage, or the like, for display as a sign-in seal. In one embodiment, a link to the anti-phishing data is inserted into the webpage, rather than the anti-phishing data itself. In one embodiment, the link is configured to expire after a predefined period of time. For example, in one embodiment, the link may be configured to expire after about 10-60 seconds. However, the invention is not limited to these values, and others may also be used. The modified webpage, screen display or the like is then provided to the client device. Processing then returns to a calling process to perform other actions.

It should be noted that the invention is not constrained to the above embodiment, and other flows, orders, sequences of actions, may also be employed, without departing from the scope of the invention. For example, in one embodiment, virtually any of the blocks illustrated in FIG. 5 may be entered independently from the illustrated flow, or sequence. Thus, for example, the process may be entered at decision block 514, and then based on some event, flow to decision block 502.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative User Interface

FIGS. 6-9 illustrate one embodiment of a user interface for use in accessing, generating, and/or managing a client side sign-in seal useable in detecting phishing attempts at a website, application, or the like. The user interfaces illustrated in FIGS. 6-9 are not intended to be limiting in any manner, and are intended to provide one or a variety of possible embodiments for a user interface. Thus, while one embodiment of the user interface may be implemented using a web browser interface, the invention is not so restricted, and other mechanisms may be employed. For example, in one embodiment, a script, application, or the like, may be employed to provide a user interface. Moreover, one embodiment may even be implemented within MMS, without departing from the scope of the invention.

Figure 6:
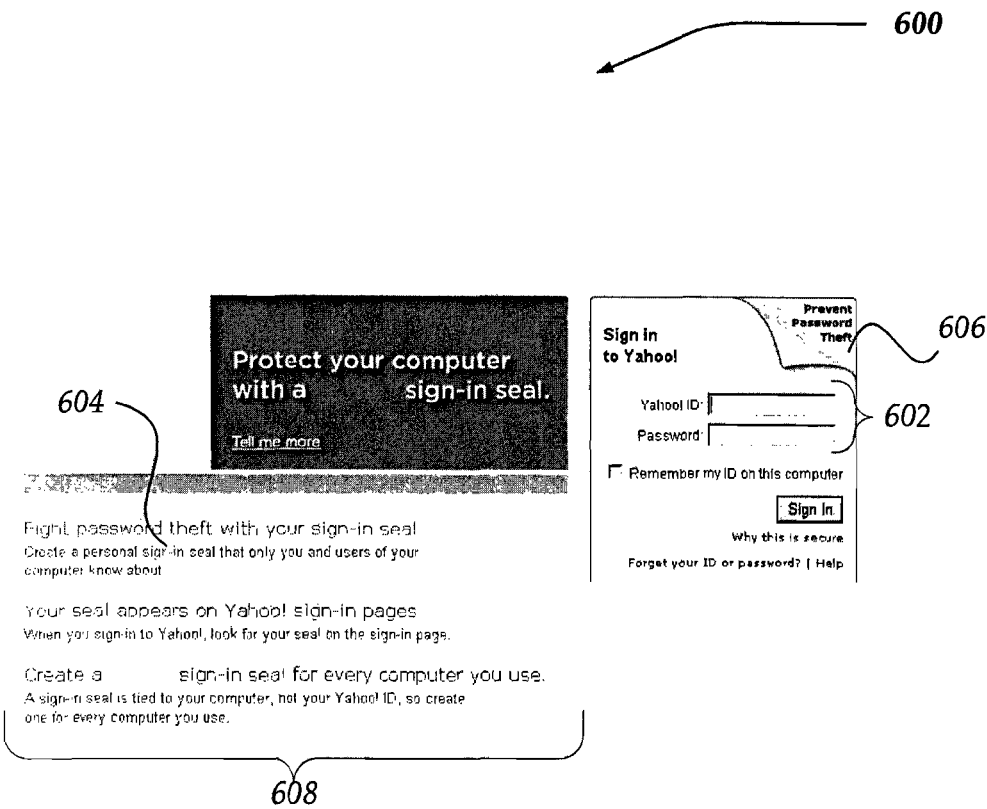
FIGS. 6-9 illustrate one embodiment of a user interface for use in generating and managing a sign-in seal, in accordance with the invention.

As shown, FIG. 6 illustrates user interface 600 useable to enable a user to create a client side sign-in seal for use in detecting phishing attempts. User interface 600 is only one example of a suitable user interface and is not intended to suggest any limitation as to the scope of use or functionality of the present invention. Thus, other user interface layouts, structures, or the like, may be employed without departing from the scope or spirit of the present invention.

One embodiment, of user interface 600 may be accessed through a website, application, or the like, that may request sensitive information. Thus, as shown in user interface 600 a user may be requested to provide their user identifier and a password (input fields 602) to access an account to a network service, or the like. Similarly, user interface 600 may, in another embodiment, represent a merchant site, where a user may be requested to enter sensitive information, such a credit card number, or the like.

In any event, as shown in user interface 600, a user may initially observe that no sign-in seal is displayed, and instead the user might see an icon, image, text, or the like, that indicates that the user may select to create a sign-in seal. One embodiment of such an image is image 606. However, others may be employed without departing from the scope of the invention. The user may then click on or otherwise select image 606 to initiate generation of their client side sign-in seal. In one embodiment, additional educational information 608 may be provided to educate the user about phishing, hackers, sign-in seals, or the like. Moreover, at least some of educational information 608 may be selected, such as create seal information 604, that may, in one embodiment, enable the user to obtain further information about sign-in seals, initiate creation and/or modification of a sign-in seal or the like.

Figure 7:
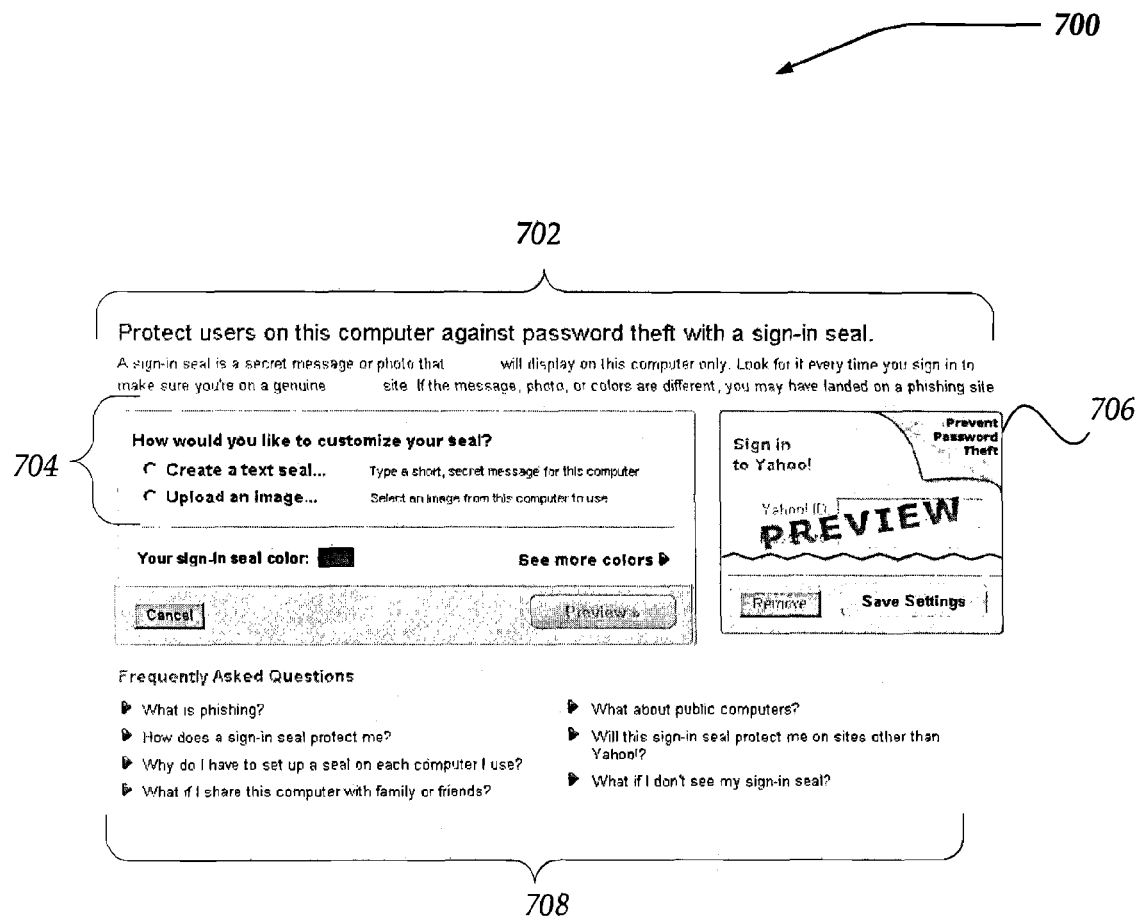

FIG. 7 illustrates one embodiment of user interface 700 that may be accessed from a website, URL link, application, or the like. For example, in one embodiment, when the user selects image 606 of FIG. 6, the user may be provided user interface 700.

User interface 700 provides one embodiment of a possible user interface that may be displayed, and other layouts, structures, or the like, may also be employed without departing from the scope of the invention.

As shown, user interface 700 includes education information 702, and frequently asked questions 708. Should the user select one of the frequently asked questions 708, in one embodiment, the selection may be expanded to provide a response. However, the invention is not so limited, and other mechanisms may be used, including, for example, directly the user to another web page, providing a 'floating window,' or the like. In one embodiment, the user may also be provided with a selection that enables the user to view a demonstration of creation and/or use of client side sign-in seals, or the like.

Also illustrated in user interface 700 is preview image 706 showing how the user's sensitive screen interface might appear. As shown, the user has not yet created a sign-in seal, thus no anti-phishing data is displayed within a sign-in seal within preview image 706.

User interface 700 also provides selections 704 that enable the user to select to create a sign-in seal based on text anti-phishing data, or based on image anti-phishing data. However, the invention is not so limited, and other selections may also be included, including enabling selection of audio data, video data, or the like. Moreover, as shown, radio selection buttons are illustrated, however, other embodiments may employ user selectable links, or the like.

Figure 8:
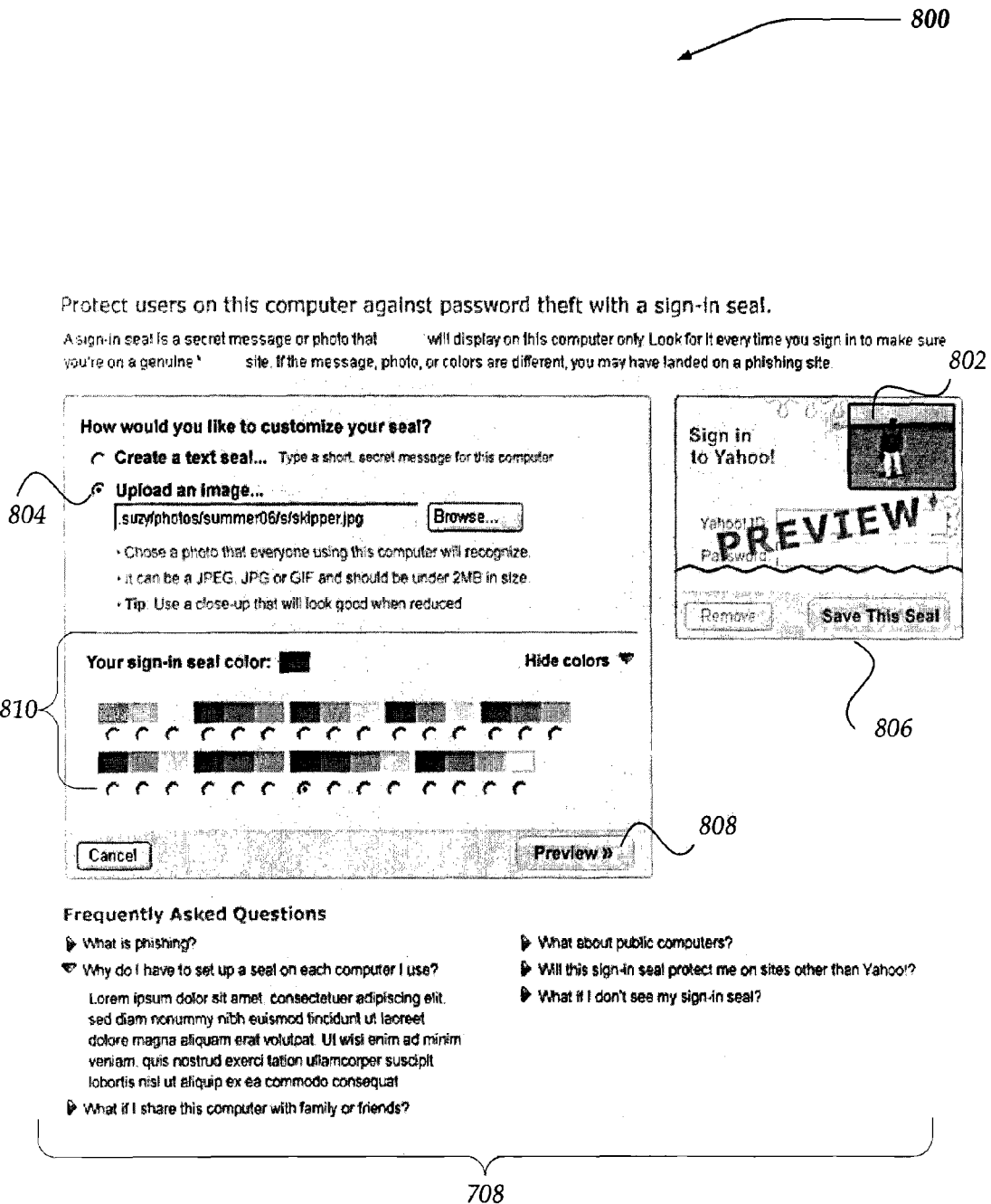

In one embodiment, when the user selects to create their sign-in seal based on an image, the user interface may be revised to display an interface similar to user interface 800 of FIG. 8.

As shown, user interface 800 illustrates that the user has input a location 804 of a user selectable image from their collection of images. The user may select images from another network device such as another website, peer computing device, their client device, or the like. In one embodiment, the user may select the image by selecting or entering a hyperlink (e.g., URL), using a menu interface, a text box, or the like. Moreover, as the user makes the selection, in one embodiment, the image may be illustrated within the preview window 802. In one embodiment, the user may be provided with a selector 806 that is configured to enable saving of the anti-phishing data in their sign-in seal. In one embodiment, selection 806 may be inactivated until the user has provided anti-phishing data.

Also shown, the user may be provided a color window 810 that allows the user to modify a color associated with their image. In one embodiment, the color window 810 may be collapsed as illustrated in FIG. 7, when no anti-phishing text, image, or the like has been provided. Thus, in one embodiment, access to different selections by the user may be progressively made visible based on a prior entry by the user. However, in one embodiment, the user may be provided with color window 810 prior to entry of other anti-phishing data, such as text, an image, or the like. It should be noted, however, that the invention is not constrained to merely enabling the user to modify color anti-phishing data, and other anti-phishing data may also be modified or added. For example, the user may be enabled to modify a size, resolution, or zoom features of the image, without departing from the scope of the invention.

Also shown, in FIG. 8 is an answer to one of the expanded frequently asked questions 708. However, the invention is not limited to displaying the answers as illustrated, and other layouts may also be employed. Moreover, although frequently asked questions 708 are illustrated in a lower region of user interface 800 the invention is not so limited and other locations may be employed, without departing from the scope of the invention.

Included in user interface 800 is a preview selector 808 that enables the user to view a sensitive sign-in screen, such as user interface 600, but now including the user's sign-in seal.

Figure 9:
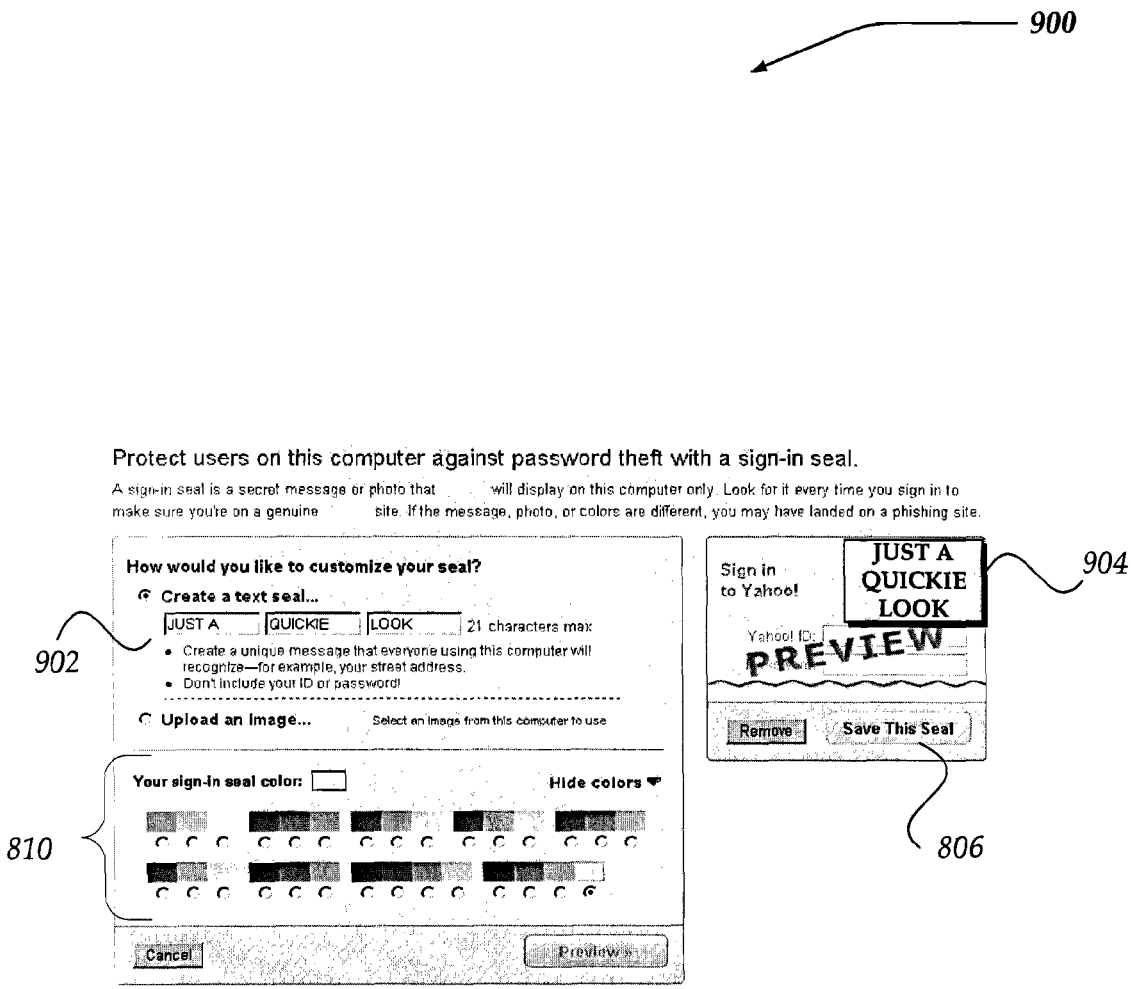

FIG. 9 illustrates one embodiment of user interface 900 that may be displayed when the user selects to create a sign-in seal based on text anti-phishing data. Thus, as shown in FIG. 9, the user may input a sequence of text, symbols, emoticons, or the like, into text field 902. Shown also, is in preview window 904 is one embodiment of a client side sign-in seal based on the entered text data. Again, the user may employ color window 810 to modify one aspect of the displayed text data, however, other aspects may also be modified by the user, including, but not limited to font type, font size, angle of the displayed text, rotation of the text, or the like. Such other aspects may be selectable by progressively displaying associated selectors, in one embodiment. Moreover, the user, as before, may select to save the anti-phishing data by selecting the selector 806.

In one embodiment, when the user selects selector 806 to save the anti-phishing data, a cookie of the like, may be generated and sent to the client device of the user. However, the invention is not so limited, and in another embodiment, the user may be provided another screen selection, that upon selection, generates, and/or sends a cookie to the client device of the user.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. In a client computing device, having a graphical user interface including a display and a user interface selection device, a method of generating an anti-phishing mechanism, comprising:

retrieving an interface screen that is configured to display user selectable anti-phishing options for use in creating a client side sign-in seal, wherein the client side sign-in seal is independent of a user authentication, and wherein the interface for at least creating and managing the client side sign-in seal is independent of a user authentication;

receiving a selection through the user interface selection device of at least one of the user selectable anti-phishing options;

modifying the interface screen to enable the user to provide anti-phishing data based on the selected anti-phishing option wherein the user is enabled to modify at least one feature of the provided anti-phishing data, in part, by modifying the interface screen to display additional selectable anti-phishing options and wherein the at least one feature further comprises at least one of a color, a size, or a rotation of the provided anti-phishing data;

displaying a requested webpage within the display; and if the webpage is authentic, based in part on the anti-phishing data, then displaying the client side sign-in seal independent of user authentication.

2. The method of claim 1, further comprising:
accessing the webpage, wherein the webpage is configured to receive sensitive information; and
selecting a link to a sign-in seal setup user interface.

3. The method of claim 1, wherein displaying selectable anti-phishing options further comprises displaying at least one of a text input option, an image input option, or an audio input option.

4. The method of claim 1, further comprising providing a selector within the interface screen to enable the user to preview the client side sign-in seal, wherein the selector is inactive until the user provides anti-phishing data.

5. The method of claim 1, further comprising:
receiving client device data in a persistent cookie, in response, in part, to providing the anti-phishing data and information about the webpage.

6. The method of claim 5, wherein the client device data further comprises information that is based in part on a characteristic of the client device.

7. A network device for detecting a phishing attack, comprising:
a transceiver to send and receive data over a network; and
a processor that is operative to perform actions, including:
providing to a client device a user interface independent of user authentication and that is configured to progressively provide selectable options to a user based on received input;
receiving from the client device, anti-phishing data for an application, independent of user authentication at the network device;
modifying the user interface to provide at least one option to enable a user to selectively modify at least one feature of the received anti-phishing data wherein the user is enabled to modify at least one feature of the provided anti-phishing data, in part, by further modifying the user interface to display additional selectable anti-phishing options and wherein the at least one feature further comprises at least one of a color, a size, or a rotation of the provided anti-phishing data;
creating a client side sign-in seal based on the anti-phishing data and optionally the at least one selectively modified feature of the received anti-phishing data, the client side sign-in seal being independent of user authentication; and
if a screen display associated with the application is requested by the client device, using the anti-phishing data to selectively display the client side sign-in seal with the screen display to indicate that the application is authentic and wherein displaying the client side sign-in seal is independent of a user authentication.

8. The network device of claim 7, wherein the anti-phishing data further comprises at least one of text, a symbol, a graphic, an image, an audio file, or a link to a graphic, an image, or an audio file.

9. The network device of claim 7, wherein the at least one feature further comprises at least one of a font size, a resolution, a displayed angle, or a font type.

10. The network device of claim 7, wherein progressively providing selectable options further comprises displaying at least one selectable option only after the user provides input to at least one prior displayed selectable option.

11. The network device of claim 7, wherein progressively providing selectable options further comprises enabling a selectable option to save anti-phishing data after the anti-phishing data is received from the client device.

12. The network device of claim 7, wherein the user interface further displays at least one user selectable frequently asked question, wherein if the user selects at least one frequently asked question an answer is displayed.

13. The network device of claim 7, wherein the application is at least one of a web application, a webpage, or a messenger application.

14. A system for use in detecting a phishing attack over a network, comprising:
a first computing device that includes a processor and computer executable instructions that enable actions, including:
sending, over the network, a user interface that is independent of a user authentication and is configured to receive anti-phishing data useable in creating a client side sign-in seal; and
in response to receiving anti-phishing data, creating a client side sign-in seal independent of user authentication;
sending another user interface, wherein the other user interface enables a user to at least one of previewing the client side sign-in seal, or providing a modification to at least one feature of the anti-phishing data wherein the user is enabled to modify at least one feature of the anti-phishing data, in part, by modifying the user interface to display additional selectable anti-phishing options and wherein the at least one feature further comprises at least one of a color, a size, or a rotation of the provided anti-phishing data; and
a second computing device that includes a processor and computer executable instructions that enable actions, including:
displaying the user interface;
sending to the first computing device anti-phishing data to be associated with a website, wherein the anti-phishing data is associated with a client device;
requesting a webpage associated with the website, wherein the webpage is configured to receive sensitive information; and
detecting a phishing attempt based on whether the client side sign-in seal is displayed by the website and wherein selectively displaying the client side sign-in seal is independent of a user authentication and is further determined based at least in part on the anti-phishing data.

15. The system of claim 14, wherein sending the anti-phishing data further comprises: providing a location identifier for at least one of an image file, a text file, or an audio file.

16. The system of claim 14, wherein sending the anti-phishing data further comprises: providing text data.

17. The system of claim 14, wherein providing a modification to at least one feature further comprises providing at least one modification to the anti-phishing data based on a font type change.

18. The system of claim 14, wherein the anti-phishing data is user independent.

19. The system of claim 14, wherein sending another user interface further comprises inhibiting the previewing of the client side sign-in seal and the providing of a modification to at least one feature until the anti-phishing data is provided.

20. The system of claim 14, wherein detecting whether the requested webpage is phished further comprises:
   if the requested webpage is displayed absent the anti-phishing data, indicating a phishing attempt; and
   if the requested webpage is displayed with the anti-phishing data, indicating that a phishing attempt is undetected.

* * * * *